United States Patent
Backfolk et al.

(10) Patent No.: US 12,264,227 B2
(45) Date of Patent: Apr. 1, 2025

(54) FOAM FORMED SOLID COMPOSITE COMPRISING NANOCELLULOSE AND SOLID LOW-DENSITY PARTICLES

(71) Applicant: Stora Enso OYJ, Helsinki (FI)

(72) Inventors: Kaj Backfolk, Lappeenranta (FI); Isto Heiskanen, Imatra (FI)

(73) Assignee: Stora Enso OYJ, Helsinki (FI)

( * ) Notice: Subject to any disclaimer, the term of this patent is extended or adjusted under 35 U.S.C. 154(b) by 155 days.

(21) Appl. No.: 17/756,983

(22) PCT Filed: Dec. 15, 2020

(86) PCT No.: PCT/IB2020/061948
§ 371 (c)(1),
(2) Date: Jun. 7, 2022

(87) PCT Pub. No.: WO2021/124090
PCT Pub. Date: Jun. 24, 2021

(65) Prior Publication Data
US 2023/0016725 A1    Jan. 19, 2023

(30) Foreign Application Priority Data
Dec. 18, 2019    (SE) .................... 1951498-3

(51) Int. Cl.
C08J 9/35 (2006.01)
B82Y 30/00 (2011.01)
C08J 9/00 (2006.01)
C08L 1/02 (2006.01)

(52) U.S. Cl.
CPC ............... *C08J 9/35* (2013.01); *B82Y 30/00* (2013.01); *C08J 9/0061* (2013.01); *C08L 1/02* (2013.01); *C08J 2301/02* (2013.01); *C08L 2203/14* (2013.01)

(58) Field of Classification Search
CPC ............ B32B 2250/03; B32B 2250/40; B32B 2264/065; B32B 2264/067; B32B 2264/102; B32B 2264/104; B32B 2266/02; B32B 2266/0221; B32B 2266/0228; B32B 2266/025; B32B 2266/0278; B32B 2266/06; B32B 2266/08; B32B 2307/102; B32B 2307/306; B32B 2307/3065; B32B 2307/718; B32B 2307/72; B32B 2307/728; B32B 2307/73; B32B 2307/732; B32B 2439/70; B32B 29/007; B32B 5/18; B32B 5/20; B82Y 30/00; C08J 2301/02; C08J 2401/00; C08J 2403/00; C08J 2405/00; C08J 2489/00; C08J 2497/00; C08J 9/0061; C08J 9/30; C08J 9/35; C08L 1/02; C08L 2203/14; D21H 11/18; D21H 21/56; D21H 27/10
See application file for complete search history.

(56) References Cited

U.S. PATENT DOCUMENTS

| | | | |
|---|---|---|---|
| 2011/0315660 A1* | 12/2011 | Yu | C01B 37/00 436/72 |
| 2016/0369078 A1* | 12/2016 | Lapidot | C08J 9/38 |
| 2017/0260694 A1* | 9/2017 | Torniainen | B32B 5/08 |
| 2017/0313838 A1 | 11/2017 | Johnansson et al. | |
| 2017/0335522 A1 | 11/2017 | Heiskanen et al. | |
| 2018/0208732 A1 | 7/2018 | Oomori | |
| 2018/0355557 A1 | 12/2018 | Heiskanen et al. | |
| 2019/0376234 A1 | 12/2019 | Mallya | |
| 2021/0259942 A1* | 8/2021 | Watanabe | C08J 3/12 |

FOREIGN PATENT DOCUMENTS

| | | | |
|---|---|---|---|
| CN | 106592319 A | 4/2017 | |
| SE | 1950568 A1 | 12/2020 | |
| WO | WO-2015173474 A1 * | 11/2015 | ............ D21F 11/002 |
| WO | 2020230035 A1 | 11/2020 | |

OTHER PUBLICATIONS

Extended European Search Report from corresponding European application No. EP20904112.8 dated Dec. 22, 2023.
Notice from corresponding Swedish application No. 1951498-3 dated Oct. 18, 2021.
International Search Report from corresponding PCT application No. PCT/IB2020/061948 mailed on Mar. 1, 2021.
Svagan, Anna J. et al., Solid cellulose nanofiber based foams—Towards facile design of sustained drug delivery systems, Journal of Controlled Release 244 (2016), 74-82.
Gordeyeva, Korneliya S. et al., Stabilizing nanocellulose-nonionic surfactant composite foams by delayed Ca-induced gelation, Journal of Colloid and Interface Science 472 (2016) 44-51.
Gordeyeva, Korneliya et al., Lightweight foams of amine-rich organosilica and cellulose nanofibrils by foaming and controlled condensation of aminosilane, Mater. Chem. Front., 2018, 2, 2220.
Fox, P.F. et al., The casein micelle: Historical aspects, current concepts and significance, International Dairy Journal 18 (2008) 677-684.
Nouryon, Product Specification Expancel Microspheres, Expancel WE, Feb. 2019.
Chinga-Carrasco, Gary, Cellulose fibres, nanofibrils and microfibrils: The morphological sequence of MFC components from a plant physiology and fibre technology point of view, Chinga-Carrasco Nanoscale Research Letters 2011, 6:417.
Fengel, D., Ultrastructural behaviour of cell wall polysaccharides, TAPPI, 1970, vol. 53, No. 3., pp. 497-503 (abstract only).

* cited by examiner

*Primary Examiner* — Hai Vo
(74) *Attorney, Agent, or Firm* — Greer, Burns & Crain, Ltd.

(57) ABSTRACT

The present invention relates to a foam formed solid composite, comprising: a matrix phase consisting of a mixture of nanocellulose, at least one foaming agent, and optional additives, and a dispersed phase consisting of solid low-density particles having a density of less than 1.2 kg/dm$^3$. The present invention further relates to a method and a liquid foam composition for manufacturing the solid composite.

19 Claims, No Drawings

FOAM FORMED SOLID COMPOSITE COMPRISING NANOCELLULOSE AND SOLID LOW-DENSITY PARTICLES

This application is a U.S. National Phase under 35 U.S.C. § 371 of International Application No. PCT/IB2020/061948, filed Dec. 15, 2020, which claims priority under 35 U.S.C. §§ 119 and 365 to Swedish Application No. 1951498-3 filed Dec. 18, 2019.

TECHNICAL FIELD

The present disclosure relates to foam formed solid composites.

BACKGROUND

Materials based on synthetic polymers, e.g. Styrofoam, are increasingly being replaced by bio-based materials, i.e. materials wholly or partly derived from biomass, such as plants, trees or animals. The biomass can have undergone physical, chemical or biological treatment. Using bio-based materials such as paper or paperboard instead of fossil-based synthetic polymers can reduce the carbon dioxide footprint and improve the recyclability of the materials.

Foamed materials can be used to create lightweight structures with high rigidity and stiffness. This, in turn, may allow for the same functionality to be achieved using less source material, i.e. source reduction. The porous structure of the foamed material may also provide additional benefits, such as good thermal and acoustic insulation properties and also protective packaging or cushioning properties.

Foamed materials are also often used in packaging applications. However, bio-based packaging materials such as paper and paperboard typically provide poor thermal and acoustic insulation compared to foamed thermoplastics. This is a problem in for example food containers for hot or cold foods or drinks, where the container may either become too hot for the consumer to handle it safely, or where the consumer may inadvertently heat up cold contents through the walls of the container.

Many solutions have been proposed in order to solve this problem. The most common solution involves providing the container with an additional layer or an insulating sleeve of insulating material, e.g. of corrugated paper or paperboard. However, this type of solution adds complexity to both manufacturing and handling of the products. Another common approach has been to provide the surface of paper or paperboard with a porous material. However, as the porous materials are typically based on synthetic polymers, this approach may counteract the purpose of replacing synthetic materials with renewable bio-based materials to reduce the carbon dioxide footprint and improve the recyclability of the packaging material.

Thus, there remains a need for recyclable bio-based materials with improved properties, e.g. in terms of thermal and/or acoustic insulation, protective packaging or cushioning properties, and/or source reduction.

DESCRIPTION OF THE INVENTION

It is an object of the present disclosure to provide an at least partially bio-based material with improved properties, e.g. in terms of thermal and/or acoustic insulation, protective packaging or cushioning properties, and/or source reduction.

It is a further object of the present disclosure to provide an at least partially bio-based material for lightweight structures with high rigidity and stiffness.

It is a further object of the present disclosure to provide an alternative to the prior art solutions for improving the thermal insulation of bio-based packaging materials, such as paper and paperboard-based packaging materials.

The above-mentioned objects, as well as other objects as will be realized by the skilled person in the light of the present disclosure, are achieved by the various aspects of the present disclosure.

The invention is based on the surprising realization that using a foam forming method, low-density particles, more specifically particles having a density of less than 1.2 $kg/dm^3$, can be effectively dispersed in a foamed aqueous mixture of nanocellulose and a foaming agent. The foam with dispersed low-density particles can then be formed and dried to obtain a solid composite.

The foamed solid composites can be used to create lightweight structures with high rigidity and stiffness. The foamed solid composites can also be used as thermal and/or acoustic insulation materials.

The obtained foam formed solid composites can be provided in a wide range of shapes for different applications. The foamed composite can be provided as a free-standing web, sheet or other structure, or as a part of a composite structure, such as a layer of a multilayer web or sheet. One important application is the use as thermal insulation layers for paper or paperboard-based packaging materials. However, it is envisaged that these solid composites could be useful in a wide range of applications where low weight or thermal and/or acoustic insulation properties are desired.

According to a first aspect illustrated herein, there is provided a foam formed solid composite, comprising:
 a matrix phase consisting of a mixture of nanocellulose, at least one foaming agent, and optional additives, and
 a dispersed phase consisting of solid low-density particles having a density of less than 1.2 $kg/dm^3$.

The term foam formed refers to the manufacturing method of the solid composite. The term foam formed is intended to encompass both a composite having a solid foam matrix phase and a composite in which the foam forming the matrix phase has been collapsed to a film.

The term solid, as used herein, refers to a material that is not liquid or fluid, but firm and stable in shape. A solid is a sample of matter that retains its shape and density when not confined. The solid may be rigid, or susceptible to plastic and/or elastic deformation. The adjective solid describes the state, or condition, of matter having this property. A solid material may be porous or non-porous.

The term composite as used herein refers to a composite material. A composite material is a material made from two or more constituent materials with significantly different physical or chemical properties that, when combined, produce a material with characteristics different from the individual components. The individual components remain separate and distinct within the finished structure, differentiating composites from mixtures and solid solutions.

Accordingly, the term solid composite as used herein refers to a composite in solid form. The term solid particles refers to porous or non-porous particles in solid form.

A solid composite comprises a solid continuous matrix phase and at least one dispersed phase consisting of solid particles dispersed in the continuous matrix phase. The matrix phase of the inventive solid composite consists of a mixture of nanocellulose, at least one foaming agent, and optional additives. The dispersed phase of the inventive solid composite consists of solid low-density particles having a density of less than 1.2 kg/dm$^3$.

The term foam, as used herein, refers to a substance made by trapping air or gas bubbles inside a solid or liquid. Typically, the volume of gas is much larger than that of the liquid or solid, with thin films separating gas pockets. Three requirements must be met in order for foam to form. Mechanical work is needed to increase the surface area. This can occur by agitation, dispersing a large volume of gas into a liquid, or injecting a gas into a liquid. The second requirement is that a foam forming agent, typically an amphiphilic substance, a surfactant or surface active component, must be present to decrease surface tension. Finally, the foam must form more quickly than it breaks down.

Foams may be open-cell or closed-cell in nature. Pores connect the gas regions in open-cell foams, while closed-cell foams have enclosed cells. The cells are usually disordered in their arrangement, with varying bubble sizes. The cells present minimal surface area, forming honeycomb shapes or tessellations.

Foams can be liquid or solid. Examples of liquid foams include shaving cream, fire retardant foam, and soap bubbles. Examples of solid foams include polystyrene and polyurethane foams.

The inventive solid composite can be obtained by first preparing an aqueous foam comprising a mixture of nanocellulose and a foaming agent and optional additives, followed by dispersing solid low-density particles having a density of less than 1.2 kg/dm$^3$ in said foam. The foam with dispersed low-density particles is then dried to obtain the solid composite.

The formation of a foam allows for low-density particles, more specifically particles having a density of less than 1.2 kg/dm$^3$, to be effectively dispersed in liquid mixture comprising nanocellulose and a foaming agent. The foam with dispersed low-density particles can then be dried to obtain a solid composite.

Nanocellulose can be effectively dispersed in the liquid phase of the foam and has been found to foam a continuous matrix phase upon drying of the foam with dispersed low-density particles to obtain a solid composite.

The obtained foam formed solid composites can be provided in a wide range of shapes for different applications. The foam formed solid composite can be provided as a free-standing web, sheet or other structure, or as a part of a composite structure, such as a layer of a multilayer web or sheet. One important application is for use as thermal insulation layers for paper or paperboard-based packaging materials.

The inventive composite can be formed by dewatering an aqueous foam layer on a wire, with or without applied suction and/or pressure, such that the foam composite is a free-standing foam formed solid composite.

The composite can also be formed by applying a foam coating on a carrier substrate, e.g. paper or paperboard, and subsequently drying the foam coating to form a foamed composite layer on the carrier substrate.

In some embodiments, a foam layer is applied on a web or wire, dewatered and/or dried, and then placed between at least two fibrous webs each having a grammage of 20-300 g/m$^2$. The foam composition will act as a foamed layer or foamed coating or foamed web between two fiber-based webs. The at least two fibrous layers may comprise fibers such as kraft pulp, CTMP, TMP, unbleached pulp, etc. The applied foam layer may for example have a dry solid content of 5-70 wt %, preferably 10-40 wt % and the dried foam may for example have a grammage of 5-100 g/m$^2$, preferably 10-50 g/m$^2$. The foam is applied in at least one step using, e.g., a roll applicator, a curtain or slot die, or a spray system. The foamed layer is preferably dewatered or dried to at least 30 wt %, preferably at least 40 wt %, but preferably not more than 90% before couched together with the other webs.

The composite layer for use as a thermal insulation layer for paper or paperboard-based packaging materials is typically thick compared to conventional coating layers. The thickness of the composite layer is typically 30 µm or higher, preferably 50 µm or higher. In some embodiments, the thickness of the composite layer is in the range of 30-1000 µm, preferably in the range of 50-500 µm, more preferably in the range of 50-300 µm.

The composite can further be formed by wet molding or by printing the foam layer by layer to obtain a foamed composite three-dimensional (3D) structure.

In some embodiments, the nanocellulose comprises cellulosic nanofibers having an average diameter in the range of 1-1 000 nm. The diameter may for example be determined from environmental scanning electron microscope (ESEM) or scanning electron microscope (SEM) images.

Nanocellulose comprises partly or totally fibrillated cellulose or lignocellulose fibers. The liberated fibrils or bundles of fibrils have a diameter less than 1000 nm, whereas the actual fibril diameter or particle size distribution and/or aspect ratio (length/width) depends on the source and the manufacturing methods. The smallest fibril is called elementary fibril and has a diameter of approximately 2-4 nm (see e.g. Chinga-Carrasco, G., *Cellulose fibres, nanofibrils and microfibrils: The morphological sequence of MFC components from a plant physiology and fibre technology point of view, Nanoscale research letters* 2011, 6:417), while it is common that the aggregated form of the elementary fibrils, also defined as microfibril, is the main product that is obtained when making MFC e.g. by using an extended refining process or pressure-drop disintegration process (Fengel, D., *Ultrastructural behavior of cell wall polysaccharides*, Tappi J., March 1970, Vol 53, No. 3). Depending on the source and the manufacturing process, the length of the fibrils can vary from around 1 to more than 10 micrometers. A coarse nanocellulose grade might contain a substantial fraction of fibrillated fibers, i.e. protruding fibrils from the tracheid (cellulose fiber), and with a certain amount of fibrils liberated from the tracheid (cellulose fiber).

There are different synonyms for nanocellulose such as cellulose microfibrils, fibrillated cellulose, nanofibrillated cellulose (NFC), fibril aggregates, nanoscale cellulose fibrils, cellulose nanofibers, cellulose nanofibrils, nanocrystalline cellulose, cellulose microfibers, cellulose fibrils, cellulose nanofilaments, microfibrillar cellulose, microfibrillated cellulose (MFC), microfibril aggregrates and cellulose microfibril aggregates.

Nanocellulose can also be characterized by various physical or physical-chemical properties such as its large surface area or its ability to form a gel-like material at low solids (1-5 wt %) when dispersed in water. The cellulose fiber is preferably fibrillated to such an extent that the final specific surface area of the formed nanocellulose is from about 1 to about 500 m$^2$/g, such as from about 1 to about 200 m$^2$/g, or more preferably 50-200 m$^2$/g when determined for a solvent exchanged and freeze-dried material with the BET method.

Various methods exist to make nanocellulose, such as single or multiple pass refining, pre-hydrolysis or enzymatic treatment followed by refining or high shear disintegration or liberation of fibrils.

One or several pre-treatment steps are usually required in order to make nanocellulose manufacturing both energy efficient and sustainable. The cellulose fibers of the pulp to be utilized may thus be pre-treated, for example enzymatically or chemically, for example to hydrolyse or swell the fibers or to reduce the quantity of hemicellulose or lignin. The cellulose fibers may be chemically modified before fibrillation, such that the cellulose molecules contain other (or more) functional groups than found in the original or native cellulose. Such groups include, among others, carboxymethyl (CM), aldehyde and/or carboxyl groups (cellulose obtained by N-oxyl mediated oxidation, for example "TEMPO"), quaternary ammonium (cationic cellulose) or phosphoryl groups. After being modified or oxidized in one of the above-described methods, it is easier to disintegrate the fibers into nanocellulose or nanofibrillar size fibrils.

The nanocellulose may contain some hemicelluloses, the amount of which is dependent on the plant source and the pulping and bleaching process. Mechanical disintegration of the fibers is carried out with suitable equipment such as a refiner, grinder, homogenizer, colloider, friction grinder, single- or twin-screw extruder, ultrasound sonicator, fluidizer such as microfluidizer, macrofluidizer or fluidizer-type homogenizer. Depending on the nanocellulose manufacturing method, the product might also contain fines, or nanocrystalline cellulose, or other chemicals present in wood fibers or in the papermaking process. The product might also contain various amounts of micron size fiber particles that have not been efficiently fibrillated.

Nanocellulose can be produced from wood cellulose fibers, both from hardwood and softwood fibers. It can also be made from microbial sources, agricultural fibers such as wheat straw pulp, bamboo, bagasse, or other non-wood fiber sources. It is preferably made from pulp including pulp from virgin fiber, e.g. mechanical, chemical and/or thermomechanical pulps. It can also be made from broke or recycled paper. The term nanocellulose includes parenchymal nanocellulose and BNC (bacterial nanocellulose). Nanocellulose can also be obtained from vegetable fibers, e.g. sugar beet or potato based nanocellulose.

The above described definition of nanocellulose includes, but is not limited to, the definition of nanocellulose in the ISO/TS 20477:2017 standard.

The nanocellulose of the solid composite may be unmodified nanocellulose or chemically modified nanocellulose, or a mixture thereof. In some embodiments, the nanocellulose is an unmodified nanocellulose.

Unmodified nanocellulose refers to nanocellulose made of unmodified or native cellulose fibers. The unmodified nanocellulose may be a single type of nanocellulose, or it can comprise a mixture of two or more types of nanocellulose, differing e.g. in the choice of cellulose raw material or manufacturing method.

Chemically modified nanocellulose refers to nanocellulose made of cellulose fibers that have undergone chemical modification before, during or after fibrillation. In some embodiments, the nanocellulose is a chemically modified nanocellulose. The chemically modified nanocellulose may be a single type of chemically modified nanocellulose, or it can comprise a mixture of two or more types of chemically modified nanocellulose, differing e.g. in the type of chemical modification, the choice of cellulose raw material or the manufacturing method. In some embodiments, the chemically modified nanocellulose is microfibrillated dialdehyde cellulose (DA-MFC). DA-MFC is a dialdehyde cellulose treated in such way that it is microfibrillated. Dialdehyde cellulose can be obtained by oxidation of cellulose. Microfibrillated dialdehyde cellulose can be obtained by treating dialdehyde cellulose for example by a homogenizer or in any other way such that fibrillation occurs to produce microfibrillated dialdehyde cellulose.

The matrix phase of the solid composite may be comprised solely of a mixture of nanocellulose and foaming agent, or it can comprise the mixture of nanocellulose and foaming agent combined with other ingredients or additives. Depending on the purpose of the granules, a lower amount of nanocellulose can be used as a foam stabilizing agent, or a higher amount of nanocellulose can be used as a functional additive in the final granules. The matrix phase of the solid composite preferably includes nanocellulose as its main component based on the total dry weight of the matrix phase of the solid composite. In some embodiments, the matrix phase comprises in the range of 5-99.5 wt %, preferably in the range of 30-99.5 wt %, preferably in the range of 50-99.5 wt %, preferably in the range of 60-99.5 wt %, more preferably in the range of 65-98 wt % of nanocellulose, based on the total dry weight of the matrix phase.

The foaming agent is a compound capable of forming and/or stabilizing a foam in an aqueous composition. The foaming agent is typically an amphiphilic substance, i.e. a chemical compound possessing both hydrophilic and hydrophobic (lipophilic) properties. A foaming agent reduces the work needed to create the foam by reducing the surface tension of the liquid and increases the colloidal stability of the foam by inhibiting coalescence of bubbles.

The foaming agent of the solid composite may be any foaming agent suitable for facilitating the formation of a foam in an aqueous nanocellulose dispersion and for stabilizing the formed foam. In other words, the foaming agent should be capable of forming a stable foam in an aqueous nanocellulose dispersion.

In some embodiments, the foaming agent is a non-ionic surfactant.

Certain polymeric foaming agents have been found to be particularly useful in the present invention. In addition to acting as foaming agents, polymeric foaming agents may also improve the stability and mechanical properties of the solid composite formed when the water of the aqueous foam has evaporated. The use of a polymeric foaming agent may therefore reduce or completely dispense with addition of an optional additional polymeric binder. Thus, in some preferred embodiments the foaming agent is a polymeric foaming agent.

The polymeric foaming agent is preferably an amphiphilic polymer, i.e. a polymer possessing both hydrophilic and hydrophobic (lipophilic) properties. In some embodiments, the at least one foaming agent is water-soluble. The polymeric foaming agent may for example be a water-soluble polymer with hydrophobic moieties, such as a hydrophilic polymeric backbone provided with hydrophobic sidechains, or a block copolymer comprised of hydrophilic and hydrophobic sections.

In some embodiments, the at least one foaming agent is selected from the group consisting of optionally hydrophobically modified polysaccharides, proteins, polyvinyl alcohol, polyvinyl acetate and mixtures thereof. The optional hydrophobic modification typically comprises one or more hydrophobic groups, e.g. alkyl groups, covalently attached to the foaming agent.

In some embodiments, the at least one foaming agent is an optionally hydrophobically modified polysaccharide selected from the group consisting of optionally hydrophobically modified cellulose, starch, hemicellulose and mixtures thereof.

In some embodiments, the at least one polymeric foaming agent is an optionally hydrophobically modified polysaccharide selected from the group consisting of optionally hydrophobically modified cellulose acetate (CA), ethyl(hydroxyethyl)cellulose (EHEC), methylcellulose (MC), ethylcellulose (EC), hydroxyethylcellulose (HEC), hydroxypropylcellulose (HPC), sodium carboxymethylcellulose (CMC), hydroxypropylmethylcellulose (HPMC), sulfoethylcellulose, starch, and mixtures thereof.

In some embodiments, the at least one polymeric foaming agent is selected from the group consisting of ethyl(hydroxyethyl)cellulose, hydrophobically modified ethyl(hydroxyethyl)cellulose (HM-EHEC), hydroxyethylcellulose, hydrophobically modified hydroxyethyl cellulose (HM-HEC), methylcellulose (MC), hydrophobically modified methylcellulose (HM-MC), hydrophobically modified carboxymethylcellulose (HM-CMC), and hydrophobically modified starch (HM-starch). Examples of useful hydrophobically modified starch derivatives include, but are not limited to dialdehyde starch, hydroxypropylated starch, octenyl succinic anhydride (OSA) starch, and dodecyl succinic anhydride (DDSA) starch.

In some embodiments, the at least one polymeric foaming agent is an optionally hydrophobically modified methyl cellulose.

In some embodiments, the at least one polymeric foaming agent is a hydrophobically modified polyvinyl alcohol (PVOH), such as ethylene modified PVOH. In some embodiments, the polymeric foaming agent is a polyvinyl alcohol containing at least 2% acetate groups, more preferably at least 10% acetate groups, and even more preferably at least 15% acetate groups.

The at least one polymeric foaming agent may also be a charged amphiphilic polymer. The charge may facilitate the retention of the polymer.

The at least one polymeric foaming agent may also be a mixture of different amphiphilic polymers or derivatives of the above-mentioned amphiphilic polymers.

In some embodiments, the polymeric foaming agent has a molecular weight above 5 000 g/mol, preferably above 10 000 g/mol, more preferably above 25 000 g/mol, and more preferably above 50 000 g/mol. The molecular weight refers to the weight average molecular weight $M_w$.

In some embodiments, the matrix phase comprises in the range of 0.1-80 wt %, preferably in the range of 0.5-50 wt %, preferably in the range of 0.5-10 wt %, preferably in the range of 0.5-5 wt %, more preferably in the range of 2-5 wt % of foaming agent, based on the total dry weight of the matrix phase.

In some applications, such as in materials intended for contact with foodstuff, low molecular components which could potentially migrate or be leached from the material, are preferably avoided. Thus, in some embodiments the composite is free from surface active chemicals having a molecular weight below 1 000 g/mol. Instead the foaming agent is comprised of polymeric foaming agent(s) less prone to migration or leaching.

The foaming agent may optionally be combined with one or more polymeric dispersing and/or rheology modifying agents. The inventors have found that the addition of a polymeric dispersing and/or rheology modifying agent can further improve the foam formation and the stability of the formed aqueous foam. A polymeric dispersing and/or rheology modifying agent may also improve the stability and mechanical properties of the solid composite formed when the water of the aqueous foam has evaporated.

A polymeric dispersing and/or rheology modifying agent may be especially useful when the foaming agent is not a polymeric foaming agent. However, a polymeric dispersing and/or rheology modifying agent may also be useful when the foaming agent is a polymeric foaming agent, but additional modification of the foam properties is desired. The polymeric dispersing and/or rheology modifying agent may be a dispersing agent, a rheology modifying agent or a combination of both.

Examples of dispersing agents useful in the solid composite include, but are not limited to, polycarboxylates such as polyacrylates or carboxylated polysaccharides, and polyphosphates.

Examples of rheology modifying agents useful in the solid composite include, but are not limited to, cellulosic polymers, starch, alginate, proteins, polyacrylates and other acrylic polymers and ethoxylated polyurethanes.

Examples of polymeric dispersing and/or rheology modifying agents useful in the solid composite include, but are not limited to, polycarboxylates such as polyacrylates or carboxylated polysaccharides.

In some embodiments, the polymeric dispersing and/or rheology modifying agent is a carboxymethyl cellulose (CMC).

The concentration of the polymeric dispersing and/or rheology modifying agent is suitably selected depending on the type and molecular weight of the polymer. In some embodiments, the solid composite comprises in the range of 0.1-20 wt %, preferably in the range of 0.3-10 wt %, more preferably in the range of 0.5-5 wt % of the polymeric dispersing and/or rheology modifying agent, based on the total dry weight of the solid composite.

The formulation of the solid composite may vary depending on the intended use. The formulation of the solid composite may also vary depending on the intended mode of application or formation of the solid composite, e.g. coating of a foamed aqueous mixture of the foam onto a substrate or formation of a free-standing solid composite film. The matrix phase of the solid composite may include a wide range of ingredients in varying quantities to improve the end performance of the product or processing of the composite.

The matrix phase of the solid composite may further comprise additives such as starch, a filler, retention aids, flocculation additives, deflocculating additives, dry strength additives, softeners, or mixtures thereof. The solid matrix phase of the composite may further comprise additives that will improve different properties of the mixture and/or the produced film such as latex and/or polyvinyl alcohol (PVOH) for enhancing the ductility of the composite.

In some embodiments, the matrix phase of the solid composite further comprises a polymeric binder. In some preferred embodiments, the solid composite further comprises PVOH. The PVOH may be a single type of PVOH, or it can comprise a mixture of two or more types of PVOH, differing e.g. in degree of hydrolysis or viscosity. The PVOH may for example have a degree of hydrolysis in the range of 80-99 mol %, preferably in the range of 88-99 mol %. Furthermore, the PVOH may preferably have a viscosity above 5 mPa×s in a 4% aqueous solution at 20° C. DIN 53015/JIS K 6726.

In some embodiments, the solid composite further comprises a pigment. The pigment may for example comprise inorganic particles of talcum, silicates, carbonates, alkaline earth metal carbonates and ammonium carbonate, or oxides, such as transition metal oxides and other metal oxides. The pigment may also comprise nano-size pigments such as nanoclays and nanoparticles of layered mineral silicates, for instance selected from the group comprising montmorillonite, bentonite, kaolinite, hectorite and hallyosite.

In some embodiments, the pigment is selected from the group consisting of nanoclays and nanoparticles of layered mineral silicates, more preferably bentonite.

In some embodiments, the matrix phase comprises in the range of 50-99.5 wt %, preferably in the range of 60-99.5 wt %, more preferably in the range of 65-98 wt % of nanocellulose, based on the total dry weight of the matrix phase, and in the range of 1-10 wt %, preferably in the range of 1-5 wt %, more preferably in the range of 2-5 wt % of polymeric foaming agent, based on the total dry weight of the matrix phase.

In some embodiments, the matrix phase comprises in the range of 50-99.5 wt %, preferably in the range of 60-99.5 wt %, more preferably in the range of 65-98 wt % of nanocellulose, based on the total dry weight of the matrix phase, and in the range of 0.1-10 wt %, preferably in the range of 0.5-5 wt %, more preferably in the range of 2-5 wt % of polymeric foaming agent, based on the total dry weight of the matrix phase, and in the range of 0.1-20 wt %, preferably in the range of 0.3-10 wt %, more preferably in the range of 0.5-5 wt % of the polymeric dispersing and/or rheology modifying agent, based on the total dry weight of the matrix phase, and wherein the combined amount of the polymeric foaming agent and the polymeric dispersing and/or rheology modifying agent is in the range of 1-20 wt %, preferably in the range of 1-10 wt %, more preferably in the range of 1-5 wt %, more preferably in the range of 2-5 wt %, based on the total dry weight of the matrix phase.

The dispersed phase of the solid composite consists of solid low-density particles having a density of less than 1.2 kg/dm$^3$. The invention is based on the surprising realization that using a foam forming method, low-density particles, more specifically particles having a density of less than 1.2 kg/dm$^3$, can be effectively dispersed in a foamed aqueous mixture of nanocellulose and a foaming agent.

In some embodiments, the dispersed phase consists of solid low-density particles having a density of less than 1.1 kg/dm$^3$, preferably less than 1.0 kg/dm$^3$, less than 0.9 kg/dm$^3$, less than 0.8 kg/dm$^3$, less than 0.7 kg/dm$^3$, less than 0.6 kg/dm$^3$, less than 0.5 kg/dm$^3$, less than 0.4 kg/dm$^3$, less than 0.3 kg/dm$^3$ or less than 0.2 kg/dm$^3$.

In some embodiments, the solid low-density particles of the dispersed phase are porous particles. Porous particles may be of particular interest for their low weight and thermal insulation properties. The porous particles may comprise closed pores, open pores, or a combination of closed and open pores. In some embodiments, the solid low-density particles are porous with closed pores or have a combination of closed pores and open pores. In some embodiments, the dispersed phase consists of solid low-density particles having a specific surface area (BET) above 50 m$^2$/g, preferably above 70 m$^2$/g, and more preferably above 100 m$^2$/g.

The average particle size can be analyzed using an air-jet sieve analyzer. Results are then presented as a particle-size distribution and as the particle size at which 50 wt % of the particles were below the given size denoted as the median particle diameter, or d50.

In some embodiments, the solid particles have a d50 average particle size in the range of 5-10 000 µm, preferably in the range of 5-1 000 µm, preferably in the range of 5-800 µm, and more preferably in the range of 5-600 µm.

In some embodiments, the solid low-density particles have an aspect ratio in the range of 1:1 to 20:1.

In order to facilitate forming of the solid composite, the solid low-density particles preferably have low or zero solubility in water. More preferably, the solid low-density particles are insoluble in water at 25° C. This allows for mixing of the particles in the aqueous foam without any substantial dissolution of the particles occurring during preparation of the solid composite. Low solubility in the context of this disclosure means that less than 20%, preferably less than 10%, more preferably less than 5%, most preferably less than 1%, of the dry weight of the particles is lost into solution (i.e. into the matrix phase) during preparation of the solid composite.

The solid low-density particles may for example comprise fully bio-based materials such as wood or other biomass, fully or partly bio-based semisynthetic polymer foams, such as fully or partly bio-based polyurethane foam, styrofoam, polyethylene foam, or fully synthetic foams, such as synthetic styrofoam.

Preferably however, the particulate material is a fully or partly bio-based material. In some embodiments, the particulate material is a fully bio-based material such as wood or other biomass. In some embodiments, the solid low-density particles are wood particles.

In preferred embodiments, the solid low-density particles are bio-based and/or renewable and/or compostable particles. Using bio-based and/or renewable and/or compostable particles allows for preparation of a solid composite which is based entirely or at least mainly on renewable and/or compostable materials.

In some embodiments, the solid low-density particles are selected from the group consisting of polysaccharide, lignin and protein particles.

In some embodiments, the solid low-density particles are polysaccharide particles selected from the group consisting of starch, hemicellulose or cellulose particles, or mixtures thereof.

In some embodiments, the solid low-density particles comprise hornificated cellulose beads, microcrystalline cellulose (MCC) particles, starch granules, chemically modified starch particles or chemically modified cellulose particles.

The solid low-density particles may be chemically and/or physically crosslinked in order to reduce their solubility in water.

In some embodiments, the solid low-density particles are hydrophobized.

In some embodiments, the solid composite comprises in the range of 0.1-90 wt %, preferably in the range of 0.1-80 wt %, preferably in the range of 0.1-50 wt %, preferably in the range of 0.3-35 wt %, more preferably in the range of 0.5-20 wt % of the solid low-density particles, based on the total dry weight of the composite.

In some embodiments, the solid composite comprises in the range of 10-50 wt %, preferably in the range of 10-35 wt %, more preferably in the range of 10-20 wt % of the solid low-density particles, based on the total dry weight of the composite.

In some more specific embodiments, the matrix phase comprises in the range of 50-99.5 wt %, preferably in the range of 60-99.5 wt %, more preferably in the range of 65-98 wt % of nanocellulose, and in the range of 0.1-10 wt %, preferably in the range of 0.5-5 wt %, more preferably in the range of 2-5 wt % of polymeric foaming agent, based on the total dry weight of the matrix phase, and the solid composite comprises in the range of 0.1-50 wt %, preferably in the range of 0.3-35 wt %, more preferably in the range of 0.5-20 wt % of the solid low-density particles, based on the total dry weight of the solid composite.

In some embodiments, the density of the composite is less than 0.7 kg/dm³, preferably less than 0.5 kg/dm³, more preferably less than 0.35 kg/dm³ and more preferably less than 0.2 kg/dm³.

In some embodiments, the solid composite has a repulpability characterized by a reject rate (as determined according to the PTS RH 021/97 test method) below 30%, preferably below 25%.

The solid composite described herein with reference to the first aspect may advantageously be used in containers, particularly food containers, for holding hot or cold contents.

Thus, according to a second aspect illustrated herein, there is provided a packaging material comprising a composite according to the first aspect.

In some embodiments, the solid composite described herein is a part of a multilayer packaging material comprising, in addition to a layer of the solid composite, one or more additional layers providing mechanical properties, barrier properties, optical properties or aesthetic properties to the multilayer packaging material.

In some embodiments, the multilayer packaging material comprises a layer of the solid composite placed between at least two fibrous webs each having a grammage of 20-300 g/m². The at least two fibrous layers may comprise fibers such as kraft pulp, CTMP, TMP, unbleached pulp, etc. The solid composite may for example have a grammage of 5-100 g/m², preferably 10-50 g/m².

According to a third aspect illustrated herein, there is provided a method for manufacturing a solid composite, comprising:
a) preparing an aqueous mixture of nanocellulose and a foaming agent and optional additives,
b) foaming said mixture to obtain a foam,
c) dispersing solid low-density particles having a density of less than 1.2 kg/dm³ in said foam,
d) drying said foam with dispersed low-density particles to obtain a solid composite.

The nanocellulose and the foaming agent in step a) may be further defined as set out above with reference to the first aspect.

In some embodiments, the total solid content of the aqueous mixture prior to foaming is preferably in the range of 1-50 wt %.

In some embodiments, the aqueous mixture prior to foaming comprises in the range of 5-99.5 wt %, preferably in the range of 30-99.5 wt %, preferably in the range of 50-99.5 wt %, preferably in the range of 60-99.5 wt %, more preferably in the range of 65-98 wt % of nanocellulose, based on the total dry weight of the aqueous mixture.

In some embodiments, the aqueous mixture prior to foaming comprises in the range of 0.1-80 wt %, preferably in the range of 0.5-50 wt %, preferably in the range of 0.5-10 wt %, preferably in the range of 0.5-5 wt %, more preferably in the range of 2-5 wt % of foaming agent, based on the total dry weight of the aqueous mixture.

The nanocellulose, foaming agent and optional additives may be further defined as set out above in respect of the first aspect.

In some embodiments, the foaming agent is a polymeric foaming agent.

The dissolved polymeric components of the aqueous mixture, particularly a polymeric foaming agent and/or a polymeric dispersing and/or rheology modifying agent make the aqueous mixture viscous. Higher viscosity of the aqueous mixture is believed to promote formation of a solid closed cell foam in the matrix phase.

The viscosity of the aqueous mixture is related to the total content of dissolved polymer in the aqueous mixture. In some embodiments, the total content of dissolved polymer in the aqueous mixture prior to foaming is 0.3 wt % or higher, preferably 0.5 wt % or higher based on the weight of water in the aqueous mixture. In some embodiments, the total content of dissolved polymer in the aqueous mixture prior to foaming is in the range of 0.3-10 wt %, preferably in the range of 0.5-5 wt % based on the weight of water in the aqueous mixture.

In some embodiments, the foaming in step b) is achieved by high speed mixing.

In some embodiments, the solid low-density particles in step c) are added at an amount in the range of 0.1-90 wt %, preferably in the range of 0.1-80 wt %, preferably in the range of 0.1-50 wt %, preferably in the range of 0.3-35 wt %, more preferably in the range of 0.5-20 wt % of the solid low-density particles, based on the total dry weight of the composite.

In some embodiments, the solid low-density particles in step c) are added at an amount in the range of 10-50 wt %, preferably in the range of 10-35 wt %, more preferably in the range of 10-20 wt % of the solid low-density particles, based on the total dry weight of the composite.

The solid low-density particles in step c) may be further defined as set out above in respect of the first aspect.

In some embodiments, the drying in step d) is performed at a temperature above 50° C., preferably above 70° C., more preferably above 90° C. In some embodiments, the drying in step d) is performed at a temperature above 100° C.

In some embodiments, the drying in step d) is performed until the total solid content of the solid composite is at least 50 wt %, at least 60 wt %, at least 70 wt %, at least 80 wt %, at least 90 wt %, at least 95 wt %, or at least 99 wt %.

In some embodiments, a layer of the foam with dispersed low-density particles is applied on a web or wire, dewatered and/or dried, and then placed between at least two fibrous webs each having a grammage of 20-300 g/m². The at least two fibrous layers may comprise fibers such as kraft pulp, CTMP, TMP, unbleached pulp, etc. The applied foam with dispersed low-density particles may for example have a dry solid content of 5-70 wt %, preferably 10-40 wt % and may for example have a grammage of 5-100 g/m², preferably 10-50 g/m². The foam is applied in at least one step using, e.g., a roll applicator, a curtain or slot die, or a spray system. The layer of foam with dispersed low-density particles is preferably dewatered or dried to at least 30 wt %, preferably at least 40 wt %, but preferably not more than 90% before couched together with the other webs.

The foam with dispersed low-density particles obtained in step c) of the method may advantageously be stored and used as an intermediate for preparation of a solid composite. Thus, according to a fourth aspect illustrated herein, there is provided a liquid foam composition comprising:
a foam comprising an aqueous mixture of nanocellulose and a foaming agent, and
solid low-density particles having a density of less than 1.2 kg/dm³ dispersed in said foam.

While the invention has been described with reference to various exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. A foam formed solid composite, comprising:
a matrix phase consisting of a mixture of nanocellulose, at least one polymeric foaming agent, optional additives, and an optional polymeric binder, wherein the matrix phase comprises 50-99.5 wt % of nanocellulose and 0.5 to 50 wt % of the at least one polymeric foaming agent, based on a total dry weight of the matrix phase; and
a dispersed phase consisting of porous, solid low-density particles having a density of less than 1 kg/dm$^3$;
wherein the porous, solid low-density particles comprise a specific surface area above 50 m$^2$/g,
wherein said nanocellulose comprises cellulosic nanofibers having an average diameter in a range of 1-1000 nm,
wherein the at least one polymeric foaming agent is selected from a group consisting of: polysaccharides, proteins, polyvinyl alcohol, polyvinyl acetate, and mixtures thereof,
wherein the solid low-density particles are selected from a group consisting of polysaccharide, lignin, and protein particles,
wherein the solid low-density particles are hydrophobized, and,
wherein the composite comprises in a range of 0.1-90 wt % of the porous, solid low-density particles, based on a total dry weight of the composite.

2. The composite according to claim 1, wherein the matrix phase comprises in a range of 60-99.5 wt % of nanocellulose, based on a total dry weight of the matrix phase.

3. The composite according to claim 1, wherein the at least one polymeric foaming agent is an amphiphilic polymer.

4. The composite according to claim 1, wherein the at least one polymeric foaming agent is a modified polysaccharide selected from a group consisting of cellulose, starch, hemicellulose, and mixtures thereof.

5. The composite according to claim 1, wherein the at least one polymeric foaming agent is a hydrophobically modified polysaccharide selected from a group consisting of cellulose acetate (CA), ethyl(hydroxyethyl) cellulose (EHEC), methylcellulose (MC), ethylcellulose (EC), hydroxyethylcellulose (HEC), hydroxypropylcellulose (HPC), sodium carboxymethylcellulose (CMC), hydroxypropylmethylcellulose (HPMC), sulfoethylcellulose, starch, and mixtures thereof.

6. The composite according to claim 1, wherein the at least one polymeric foaming agent is a hydrophobically modified methyl cellulose.

7. The composite according to claim 1, wherein the at least one polymeric foaming agent has a molecular weight above 5,000 g/mol.

8. The composite according to claim 1, wherein the matrix phase comprises in a range of 0.5 to 10 wt % of the at least one polymeric foaming agent, based on a total dry weight of the matrix phase.

9. The composite according to claim 1, wherein the composite is free from surface active chemicals having a molecular weight below 1,000 g/mol.

10. The composite according to claim 1, wherein the matrix phase includes the polymeric binder.

11. The composite according to claim 1, wherein the dispersed phase consists of the porous, solid low-density particles having a density of less than 0.9 kg/dm$^3$.

12. The composite according to claim 1, wherein the porous, solid low-density particles have a d50 average particle size in a range of 5-10,000 μm.

13. The composite according to claim 1, wherein the porous, solid low-density particles have an aspect ratio in a range of 1:1 to 20:1.

14. The composite according to claim 1, wherein the porous, solid low-density particles comprise closed pores or a combination of closed pores and open pores.

15. The composite according to claim 1, wherein the porous, solid low-density particles have low or zero solubility in water.

16. The composite according to claim 1, wherein the porous, solid low-density particles are polysaccharide particles selected from a group consisting of starch, hemicellulose or cellulose particles, and mixtures thereof.

17. The composite according to claim 1, wherein a density of the composite is less than 0.7 kg/dm$^3$.

18. A packaging material comprising a composite according to claim 1.

19. A method for manufacturing a foamed form solid composite, comprising:
a) preparing an aqueous mixture consisting of water, nanocellulose, at least one polymeric foaming agent, and optional additives,
b) foaming said mixture to obtain a foam having a matrix phase comprising 50-99.5 wt % of the nanocellulose and 0.5 to 50 wt % of the at least one polymeric foaming agent, based on a total dry weight of the matrix phase,
c) dispersing porous, solid low-density particles having a density of less than 1.0 kg/dm$^3$, and a specific surface area above 50 m$^2$/g in said foam, and
d) drying said foam with dispersed porous, low-density particles to obtain a foamed form solid composite,
wherein said nanocellulose comprises cellulosic nanofibers having an average diameter in a range of 1-1000 nm,
wherein the at least one polymeric foaming agent is selected from a group consisting of: polysaccharides, proteins, polyvinyl alcohol, polyvinyl acetate, and mixtures thereof,
wherein the porous, solid low-density particles are selected from a group consisting of polysaccharide, lignin, and protein particles,
wherein the porous, solid low-density particles are hydrophobized, and,
wherein the foam formed solid composite comprises in a range of 0.1-90 wt % of the porous, solid low-density particles, based on a total dry weight of the composite.

* * * * *